(12) United States Patent
Schulz

(10) Patent No.: US 9,437,887 B2
(45) Date of Patent: Sep. 6, 2016

(54) INTERNALLY CONTROLLABLE FUEL CELL

(71) Applicants: Helmut Schmidt Universität, Universität der Bundeswehr Hamburg, Hamburg (DE); Hamburg Innovation GmbH, Hamburg (DE)

(72) Inventor: Detlef Schulz, Hamburg (DE)

(73) Assignees: Helmut Schmidt Universität, Universität der Bundeswehr Hamburg, Hamburg (DE); Hamburg Innovation GmbH, Hamburg (DE)

( * ) Notice: Subject to any disclaimer, the term of this patent is extended or adjusted under 35 U.S.C. 154(b) by 152 days.

(21) Appl. No.: 14/365,006

(22) PCT Filed: Dec. 6, 2012

(86) PCT No.: PCT/EP2012/074648
§ 371 (c)(1),
(2) Date: Jun. 12, 2014

(87) PCT Pub. No.: WO2013/087507
PCT Pub. Date: Jun. 20, 2013

(65) Prior Publication Data
US 2014/0370414 A1    Dec. 18, 2014

(30) Foreign Application Priority Data

Dec. 14, 2011 (DE) .................. 10 2011 088 613

(51) Int. Cl.
| | | |
|---|---|---|
| *H01M 8/04* | (2016.01) | |
| *C25B 1/12* | (2006.01) | |
| *H01M 8/02* | (2016.01) | |
| *C25B 13/02* | (2006.01) | |
| *C25B 13/04* | (2006.01) | |
| *H01M 8/10* | (2016.01) | |
| *H02N 2/18* | (2006.01) | |

(52) U.S. Cl.
CPC ............ *H01M 8/04291* (2013.01); *C25B 1/12* (2013.01); *C25B 13/02* (2013.01); *C25B 13/04* (2013.01); *H01M 8/0271* (2013.01); *H01M 8/04582* (2013.01); *H01M 8/04895* (2013.01); *H01M 8/04902* (2013.01); *H01M 2008/1095* (2013.01); *H02N 2/18* (2013.01); *Y02E 60/366* (2013.01); *Y02E 60/50* (2013.01)

(58) Field of Classification Search
CPC ................ H01M 8/04291; H01M 8/04895
See application file for complete search history.

(56) References Cited

U.S. PATENT DOCUMENTS

| | | | |
|---|---|---|---|
| 6,555,945 B1 * | 4/2003 | Baughman ............. | F03G 7/005 136/291 |
| 2004/0095127 A1 * | 5/2004 | Mohri ................ | G01R 31/3606 324/117 R |
| 2009/0068506 A1 * | 3/2009 | Tomura ............... | H01M 8/0269 429/431 |
| 2010/0288370 A1 * | 11/2010 | Volden .................. | A41D 31/02 137/13 |
| 2013/0095400 A1 * | 4/2013 | Lundblad ............ | F16K 99/0005 429/422 |

FOREIGN PATENT DOCUMENTS

| | | | |
|---|---|---|---|
| WO | WO 2007/119162 A1 | 10/2007 | |
| WO | WO 2009/024779 A1 | 2/2009 | |

OTHER PUBLICATIONS

K. Heuck et al., Elektrische Energieversorgung [Electrical Power Supply], $8^{th}$ ed., Wiesbaden, Vieweg, 2010, p. 22.

* cited by examiner

*Primary Examiner* — Stewart Fraser
(74) *Attorney, Agent, or Firm* — Wolf, Greenfield & Sacks, P.C.

(57) ABSTRACT

Fuel cell and/or high-pressure electrolysis cell and a fuel cell membrane arrangement for improved control of a fuel cell by an actuator connected to the fuel cell membrane.

12 Claims, 4 Drawing Sheets

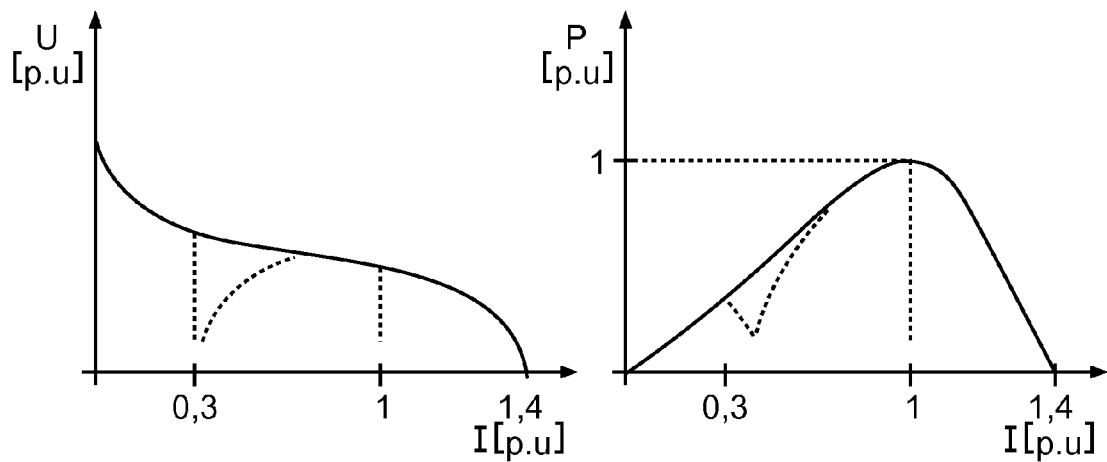
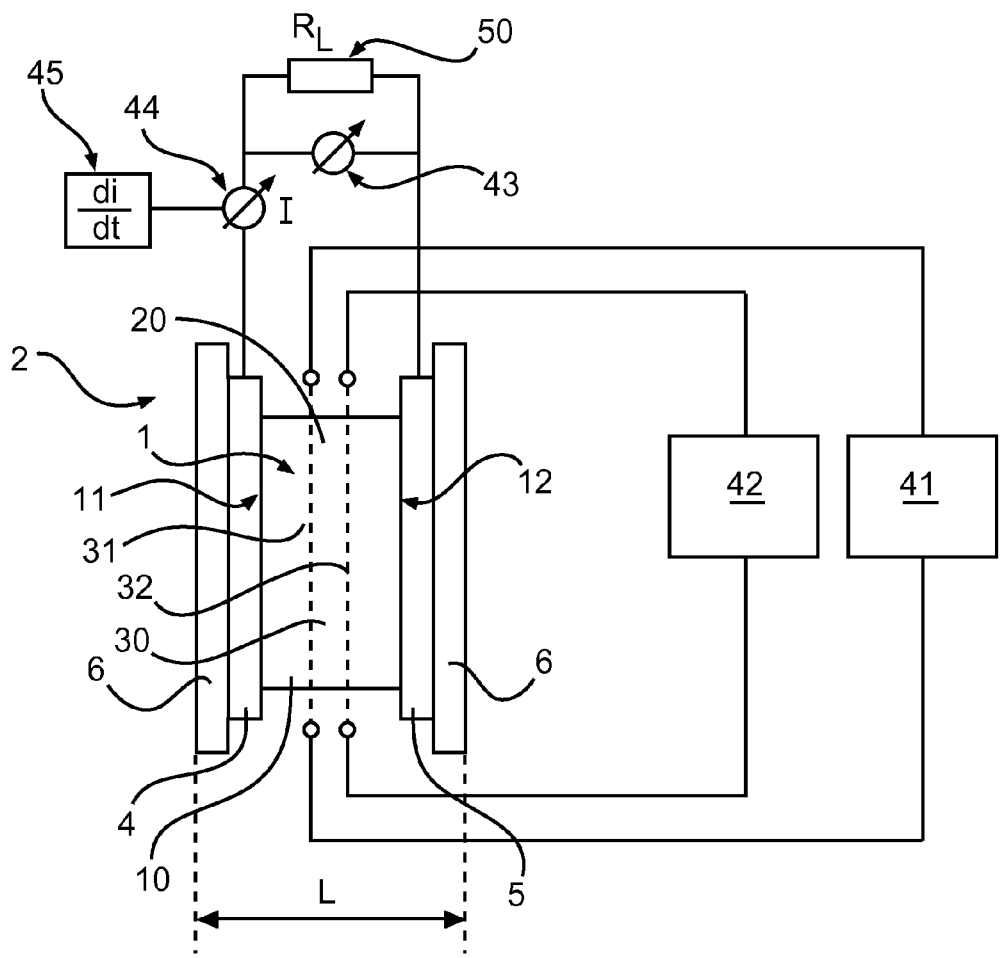
Fig. 1
Fig. 2

INTERNALLY CONTROLLABLE FUEL CELL

FIELD OF THE INVENTION

The present invention relates to a controllable fuel cell and a controllable high-pressure electrolysis cell and in particular a controllable fuel cell and a high-pressure electrolysis cell with improved dynamics and operating reliability.

BACKGROUND OF THE INVENTION

Fuel cells are used to provide an efficient energy supply with a high efficiency. However, the fuel cells in use today have a relatively low availability which is far below the availability of other energy-producing plants, for example, condensation power plants or wind power plants. Furthermore, the fuel cells in use today have relatively poor dynamics, in particular at a high load and/or in the event of a short circuit. Therefore, a complex protective technology must be used for fuel cells. Fuel cells must usually be dimensioned larger to be able to ensure a short-term overload power supply, and therefore they will have a greater weight and a comparatively low power density at the same maximum power level. In addition, the fuel cell membrane cannot be shut down quickly enough when there is a persistently high current load that could damage the fuel cell membrane.

Various types of fuel cells are known from the prior art, for example, alkaline fuel cells (AFC), polymer electrolyte membrane fuel cells (PEFC) or phosphoric acid fuel cells (PAFC) for the low-temperature range and/or melt carbonate fuel cells (MCFC) or solid oxide ceramic fuel cells (SOFC) for the high-temperature range. Such fuel cells are described, for example, in K. Heuck, K. D. Dettmann, D. Schulz: Elektrische Energieversorgung [Electrical Power Supply], 8th edition, Wiesbaden, Vieweg, 2010, page 22. In addition, DE 11 2007 000 666 T5 describes a device and method for monitoring the internal condition of a fuel cell, in which measured values are recorded by sensors for measuring electrode currents, for example. Furthermore, U.S. Pat. No. 6,949,920 B2 describes an apparatus for measuring the current density of fuel cells, in which measured values are picked up on the electrodes of the fuel cells.

SUMMARY OF THE INVENTION

The object of the present invention is to provide an improved controllability of the fuel cell.

The present invention relates to a fuel cell membrane unit, a fuel cell having such a fuel cell membrane unit and a high-pressure electrolysis cell with a fuel cell membrane unit according to the independent claims, where exemplary embodiments are incorporated in the dependent claims.

According to an exemplary embodiment of the invention, a fuel cell membrane unit is provided for use between an anode and a cathode of a fuel cell, wherein the fuel cell membrane unit provides a fuel cell membrane and an actuator, which is connected to the fuel cell membrane, wherein the actuator is designed to control a current density distribution in the fuel cell membrane.

Thus, the fuel cell can be influenced directly on the membrane by a control, for example, by a control of the properties of the electrolyte such as the conductivity, the consistency or the phase transition from liquid to solid. In this way, the reaction on the membrane of the fuel cell can be influenced by introducing an additional control element in or on the membrane of the fuel cell. The control unit and/or the control element in the form of an actuator may optionally be implemented mechanically, electrically, magnetically, optically, hydraulically or pneumatically. The operating performance of the fuel cell can be improved with such a direct control on the membrane acting without a delay. In particular the lifetime of the fuel cell can be increased due to the internal control, in particular because the fuel cell can be shut down quickly in critical operating states. Furthermore, the availability of the fuel cell is also increased because the fuel cell need not be shut down until later in a load case or in an electrical overload case and thus more time is available for the electrical supply. In addition, there is also an increase in dynamics because the fuel cell can be dimensioned for a higher reaction rate due to this internal switchability and it can supply higher current amplitudes in the millisecond range very quickly even when there is a sharp increase in the electrical load.

According to one embodiment of the present invention, the actuator has a grid structure suitable for generating an electrical field and/or a magnetic field.

Thus, the fuel cell membrane can be controlled by an electrical and/or magnetic field effect. The corresponding structures for generating an electrical and/or magnetic field in particular may be kept relatively small, so that essentially there is no increase in the structural volume of the fuel cell.

According to one embodiment of the present invention, the actuator has a horizontal grid and a vertical grid. According to one embodiment of the invention, the horizontal grid is arranged so it is rotated by essentially 90° relative to the vertical grid. It should be pointed out here that the horizontal grid and the vertical grid may also form an angle other than 90° to one another.

Thus, uniform control of the membrane over the corresponding membrane area is possible. Grid structures can be implemented relatively easily in and/or on a fuel cell membrane.

According to one embodiment of the invention, the horizontal grid and the vertical grid lie directly on one another.

Thus, a relatively small design height can be achieved. In particular in an arrangement in the membrane or between two partial membranes, the combination of a horizontal grid and a vertical grid can easily be prefabricated. It should be understood here that the horizontal grid and the vertical grid may be insulated from one another regardless of whether they are in direct abutment with one another, so that the horizontal grid and the vertical grid can be controlled separately from one another.

According to one embodiment of the invention, at least a portion of the grid structure is embedded in the fuel cell membrane.

Thus, the membrane can be controlled in its interior. It should be pointed out here that either the horizontal grid or the vertical grid or even both grids may be embedded inside the fuel cell membrane. The horizontal grid and the vertical grid may in turn lie directly on one another and may also be a distance apart from one another within the fuel cell membrane. It is understood that the horizontal grid and the vertical grid both extend essentially parallel to the main surfaces of the fuel cell membrane, i.e., to the surfaces facing the anode and/or cathode.

According to one embodiment of the invention, the horizontal grid and the vertical grid are arranged on opposite surfaces of the fuel cell membrane.

Thus, the fuel cell membrane can be provided with a corresponding horizontal grid structure and/or vertical grid structure relatively easily and can be controlled over their surfaces by this grid structure.

According to one embodiment of the invention, the actuator has a piezo element designed to generate an electrical field and/or a magnetic field when acted upon by pressure to control the fuel cell membrane.

Thus, it is possible to generate a voltage and/or a current in the actuator by application of pressure, so that it is possible to generate an electrical field and/or a magnetic field in and/or on the fuel cell membrane. The piezo element may be acted upon with a force from outside of the membrane, but it is also possible to apply a pressure directly to the piezo element by secondary devices such as a pneumatic or hydraulic system, for example, to generate the corresponding voltage and/or current.

According to one embodiment of the invention, at least one of the horizontal grid and/or the vertical grid is embodied as a grid having a plurality of piezo elements connected in parallel.

Thus, it is possible to generate a uniform electrical and/or magnetic field corresponding to the distribution of the plurality of piezo elements. In contrast with the grid described previously, which can be connected electrically by a direct current and/or voltage connection, for example, the horizontal grid and/or the vertical grid may be controlled pneumatically or hydraulically, for example, by a plurality of piezo elements connected in parallel, so that electrical current connections from the outside to the grid of the plurality of piezo elements connected in parallel are not absolutely necessary.

According to one embodiment of the invention, the actuator has a semiconductor layer and an optical fiber, wherein the optical fiber is designed to generate an electrical field and/or a magnetic field for controlling the fuel cell membrane on a p-n structure of the semiconductor due to the photoelectric effect.

Thus, the actuator can be controlled easily by optical triggering and does not necessarily have to have electrical connections. The actuator in particular may be triggered with a simple, electrically insulated optical fiber structure, which generates a voltage, for example, by external light pulses and/or light signals on the semiconductor due to the photoelectric effect. The triggering may be accomplished via traditional light but also via coherent light such as laser light, for example.

According to one embodiment of the invention, the actuator has at least one field effect transistor structure, which is designed to control an electrical field and/or a magnetic field for controlling the fuel cell membrane by way of a gate.

Thus, rapid control of the fuel cell membrane can be achieved, but with only a low control performance. The field effect transistor structure may be in particular an insulation layer field effect transistor structure.

According to one embodiment of the invention, a fuel cell having an anode, a cathode and a fuel cell membrane unit arranged between the anode and the cathode is supplied in the form described above for operation with an energy flow primarily chemically to secondarily electrically.

According to one embodiment of the invention, a high-pressure electrolysis cell with an anode, a cathode and a fuel cell membrane unit arranged between the anode and the cathode as described above is made available for operation with a flow of energy primarily electrically to secondarily chemically.

Thus, it is possible to provide not only a fuel cell, but also in the opposite reaction process, a high-pressure electrolysis cell with high dynamics and an improved controllability.

The idea of the invention can therefore be regarded as improving the control of a fuel cell and/or a high-pressure electrolysis cell to the extent that the fuel cell is controlled directly in or on the fuel cell membrane, so that longer reaction times which lead to a loss of dynamics can be ruled out or at least reduced.

It should be pointed out that the embodiments of the invention described below refer equally to the fuel cell membrane unit, the fuel cell and also the high-pressure electrolysis cell.

The individual features may of course also be combined with one another, so that advantageous effects may also be achieved to some extent, going beyond the sum of the individual effects.

These and other aspects of the present invention will be explained and illustrated by reference to the exemplary embodiments described below.

BRIEF DESCRIPTION OF THE DRAWINGS

Exemplary embodiments are described below with reference to the following drawings.

FIG. 1 shows schematically the curves of a U/I characteristic line and a P/I characteristic line of a fuel cell from the prior art.

FIG. 2 shows a schematic design of a fuel cell membrane unit and/or a fuel cell according to an exemplary embodiment of the invention.

FIG. 7b shows a sectional view of a basic design according to FIG. 7a.

DETAILED DESCRIPTION OF EXEMPLARY EMBODIMENTS

Figure 3:
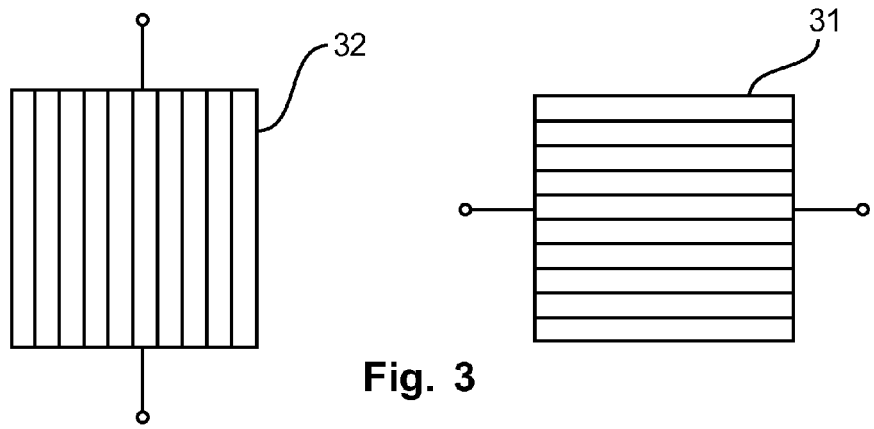
FIG. 3 shows the basic structure of a horizontal grid and/or a vertical grid according to one embodiment of the invention.

FIG. 1 shows a typical characteristic line, illustrating the relationship between voltage and current and between power and current in a fuel cell from the prior art. The voltage typically declines as the current increases. The characteristic lines of a fuel cell from the prior art shown in FIG. 1 are curves for the voltage and the current as well as the power, each plotted in a standardized form, i.e., per unit (p.u.). When there is an overload, the characteristic line changes from the curve shown here with a solid line to a curve which is shown according to the dashed line. When there is a heavy load, a voltage drop occurs at a current of 0.3. Likewise when there is a current of 0.3, a drop in performance occurs like that at a high load, e.g., at an overload or a strong dynamic load. These deficiencies at a high overload are addressed by the fuel cell membrane unit and/or fuel cell and high-pressure electrolysis cell according to the invention. FIG. 2 shows a corresponding arrangement.

FIG. 2 shows a schematic design of a fuel cell arrangement with a fuel cell membrane according to the invention. It should be pointed out that the arrangement shown there is also valid for a high-pressure electrolysis cell. In the embodiment shown here in FIG. 2, the fuel cell 2 consists of a fuel cell membrane 10 and/or a fuel cell membrane arrangement 1. An anode 4 and a cathode 5, each of which is in contact with corresponding gas conductor plates for conducting the combustion gas to the anode and/or the cathode are adjacent to the fuel cell membrane. An actuator 20, which is operatively connected to the fuel cell membrane 10, is situated in the fuel cell membrane arrangement 1 shown in FIG. 2. This actuator 20 may be arranged either in or on the fuel cell membrane 1. FIG. 2 shows an arrangement with which the actuator 20 is in a fuel cell membrane. The arrangement shown in FIG. 2 illustrates the actuator in the embodiment of a grid arrangement 30, which has a horizontal grid 31 and a vertical grid 32 here. However, it should be understood that the actuator may also be arranged on the surface of the membrane and the actuator may also consist of elements other than a grid structure 30, as will also be explained below with reference to the additional figures. In the arrangement illustrated in FIG. 2, a control unit is connected to the grid structure and in particular a trigger device 41 for triggering the horizontal grid is connected to the horizontal grid 31, which can be triggered accordingly by this trigger device. A signal may therefore be sent from the triggering device 41 for the horizontal grid to the horizontal grid. Similarly, the vertical grid 32 is connected to a triggering device 42 for the vertical grid, so that a corresponding signal for triggering the vertical grid may be sent from the triggering device 42 to the vertical grid 32. In this way, the two grids 31, 32 can be triggered separately from one another to be able to perform triggering of the fuel cell membrane. The corresponding combustion gas is directed over the gas conductor plates, which are also known as carbon separators, to the fuel cell, so that combustion can take place over the anode 4 and the cathode 5, i.e., the fuel cell membrane 1, this combustion leading to a voltage on the anode 4 and/or the cathode 5, which can be used to supply an electrical consumer 50. In FIG. 2 this consumer is identified with a load resistor RL. The voltage can be measured using a voltmeter 43 at the anode 4 and/or cathode 5 for monitoring of the fuel cell. Likewise, the current can be determined by a corresponding ammeter 44. In addition, a di/dt rate can be determined by a corresponding device 45. The length of the fuel cell is given here as L. To detect dynamic processes, for example, including short circuits, the rate of current rise di/dt must also be measured in addition to the current and the voltage. When there is an increase in the current, i.e., a current rise, the current density distribution on the membrane of the fuel cell can be made more uniform with the actuator by an external control variable. To do so, the actuator 20, here in the form of the grid structure 30 in FIG. 2, is used. Nevertheless the percentage current load on the cell Iz can also be determined from the length expansion L of the fuel cell according to $Iz=k \cdot L$ with the factor k. The factor k depends on the embodiment of the fuel cell and the type of cooling. However, the percentage current load can also be determined from a temperature increase T in the fuel cell with the factor m as $Iz=m \cdot T$. The factor m depends on the embodiment of the fuel cell and the type of cooling. Thus, with an arrangement like that shown in FIG. 2, it is possible to respond quickly to a change in measured values of the output voltage, the output current and/or the rate of current rise. This response corresponds to a "power boost" through a dynamic current density distribution on the membrane of the fuel cell. In this way, it is no longer necessary to over-dimension the fuel cell in order to carry the high local current density. Control of the current density distribution may be achieved by generating an electrical or magnetic field, for example. The fuel cell may be monitored by monitoring the output current, the output voltage and the rate of current rise.

FIG. 3 shows an embodiment of the invention in which the membrane grid consists of two components, namely a vertical grid 32 and a horizontal grid 31. The corresponding grid can be controlled via the corresponding connections to the vertical grid at the top and bottom and/or at the right and left of the horizontal grid. These two grids may be placed one above the other and offset by a 90° angle from one another, for example. However, any other angles may also be used. The grid bars may also have a curvature or a wave shape but that is not shown in the figures.

Figures 4A, 4B, 4C:
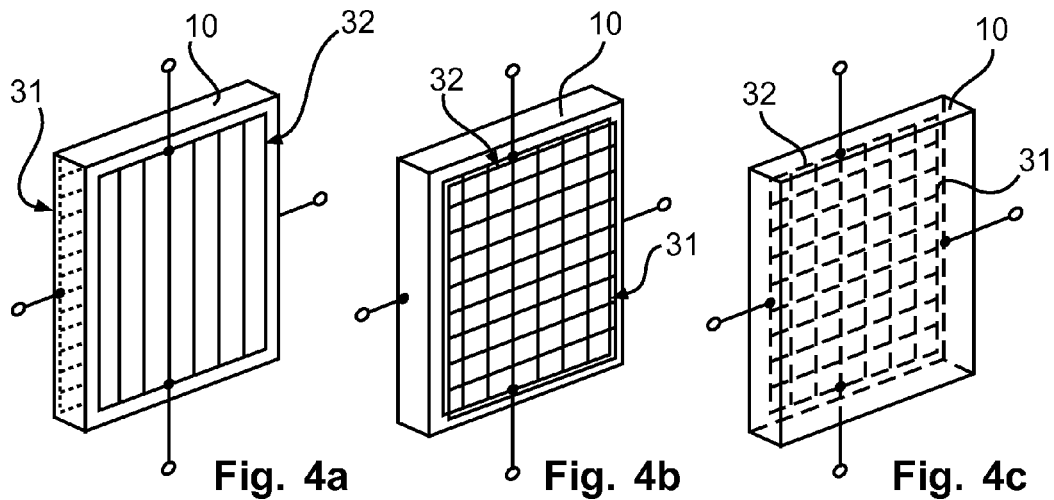
FIGS. 4a to 4c illustrate possible embodiments of a grid arrangement with respect to a fuel cell membrane according to embodiments of the invention.

FIGS. 4a, 4b and 4c describe corresponding embodiments with an arrangement of the horizontal grid 31 and/or vertical grid 32 with respect to the fuel cell membrane 10. According to FIG. 4a, the horizontal grid and the vertical grid may be arranged on two opposite sides of the fuel cell membrane 10. Through the corresponding connections, the two grids, which are arranged so they are offset from one another at a 90° angle or other angles, may also be controlled via corresponding connections. FIG. 4b shows an arrangement in which the two grids 31 and 32 are arranged one above the other. However, it should be understood here that these two grids may be electrically insulated from one another to allow them to be controlled separately from one another. The current density distribution in the fuel cell membrane may be modified through the electrical field generated and thereby controlled. FIG. 4c shows another embodiment in which the horizontal grid 31 and the vertical grid 32 are arranged inside the fuel cell membrane 10. With this arrangement, the horizontal grid and the vertical grid may be arranged one above the other but insulated from one another as well as being spaced a distance apart from one another. The structural design of the grid arrangement and the fuel cell membrane 10 is illustrated in FIGS. 5a to 5c.

Figures 5A, 5B, 5C:
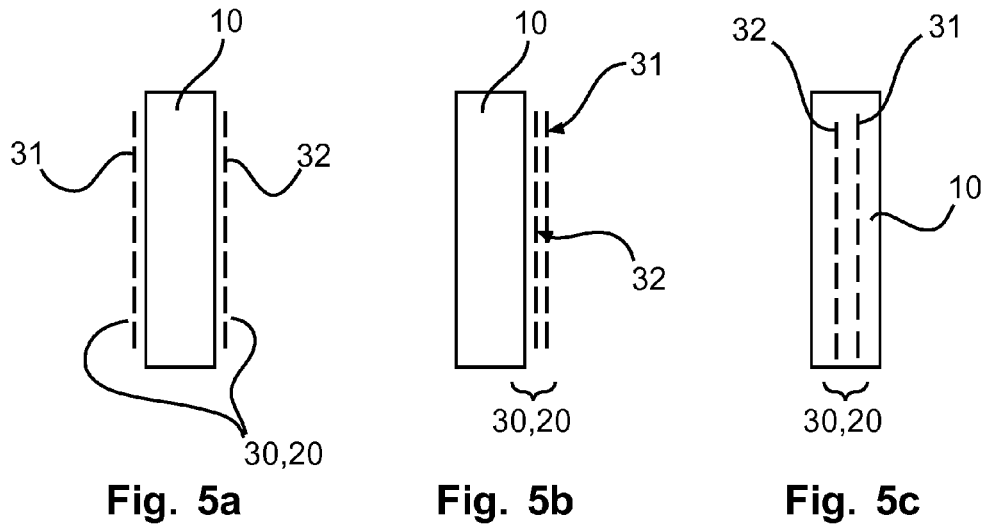
FIGS. 5a to 5c show schematic sectional views and side views of the corresponding FIGS. 4a to 4c.

FIGS. 5a to 5c show a sectional view and/or a side view through the arrangements shown in FIGS. 4a to 4c with a vertical grid and a horizontal grid and a fuel cell membrane. In FIG. 5a the horizontal grid 31 and the vertical grid 32 are located on two opposite sides of the fuel cell membrane 10. With a corresponding control of the grid structure 20, this permits a magnetic and/or electrical field to be generated within the fuel cell membrane 10, leading to control of the current density distribution in the membrane 10. However, the two grids 31 and 32 may also be arranged on one side of the fuel cell membrane 10, as shown in FIG. 5b. The actuator, i.e., the grid structure 30 here, is arranged on one of the two sides of the fuel cell membrane. Furthermore, the vertical grid 32 and the horizontal grid 31 may also be arranged inside the fuel cell membrane 10, so that the grid structure 30 is completely embedded in the fuel cell membrane 10. In the arrangement shown in FIG. 5c, the two grids 31 and 32 are spaced a distance apart from one another but they may also lie directly on one another, taking into account any insulation that may optionally be necessary.

However, the actuator or the control element may also be implemented in some way other than by a conductive grid, as is explained below.

Figure 6A:
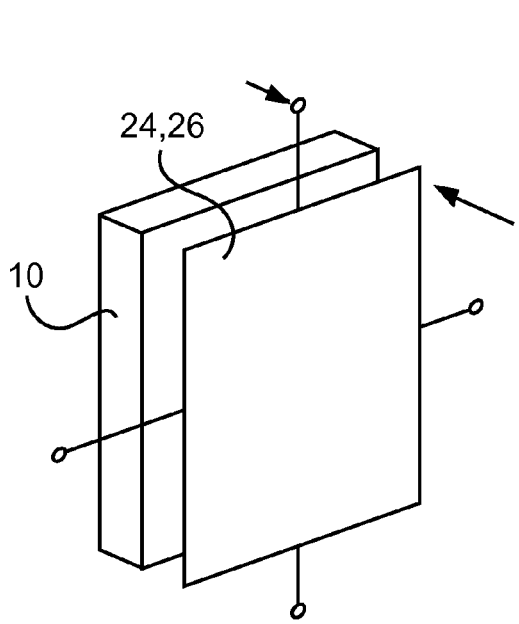
FIG. 6a shows the basic design of a fuel cell membrane with a semiconductor layer and/or a transistor structure layer.
Figure 6B:
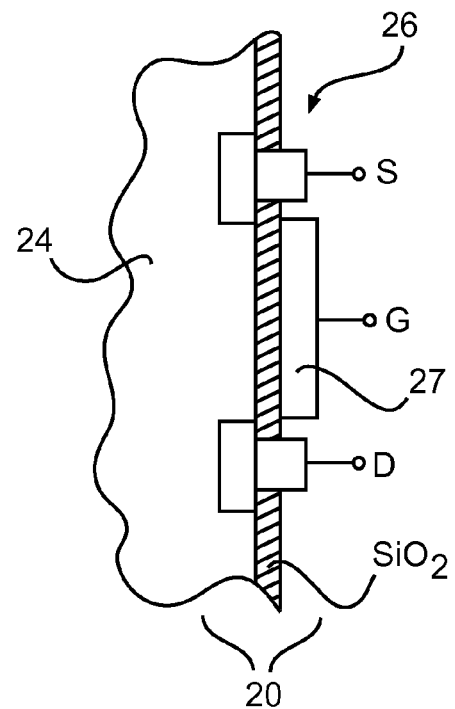
FIG. 6b shows a sectional view of a basic design of a transistor structure arrangement.

FIG. 6a shows a structural design of a semiconductor arrangement which is applied as a semiconductor layer 24 to the fuel cell membrane 10. This semiconductor layer 24 may be designed as a field effect transistor structure, a sectional view of which is shown in detail in FIG. 6b. A corresponding structure is applied to the semiconductor layer 24 consisting of a source S, a gate G and a drain D. A corresponding conductivity of the transistor can be established by controlling the gate 27, so that a current flow can be created via the triggering of the gate 27 to generate an electrical field and/or a magnetic field. In this way, the actuator in the form of the semiconductor layer, in particular in the form of a transistor structure 26, may be controlled by a relatively low control voltage across the gate. The field effect transistor may be embodied as an insulation layer field effect transistor in particular. The semiconductor layer may be embodied by vapor deposition, for example, as a thin layer with a thickness of 10 μm, for example, or as a laminated cut layer with a thickness of 100 μm, for example.

Figure 7A:
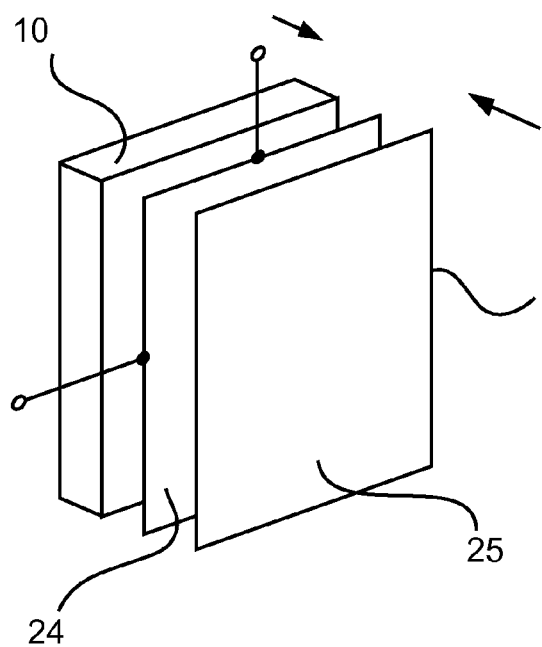
FIG. 7a shows a basic design of a semiconductor layer and an optical fiber layer according to one embodiment of the invention.
Figure 7B:
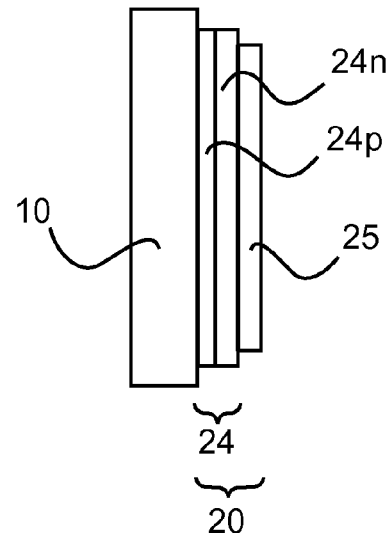

FIG. 7a shows another embodiment of the invention in which a semiconductor layer 24 is applied to the fuel cell membrane 10; in the embodiment shown here, this may be a photosensitive layer, for example. An optical layer 25 may be applied to control the photosensitive semiconductor layer 24. FIG. 7b shows a corresponding layer structure. The semiconductor layer 24 is applied to the fuel cell membrane 10 in the form of a stratification of an n-doped layer 24n and a p-doped layer 24p, such that an optical fiber layer 25 is arranged above this semiconductor layer 24. Through corresponding irradiation with light, a voltage is generated by a photoelectric effect and may be used for triggering, so that the stratification of the semiconductor layer 24 and the optical fiber 25 forms the actuator with which the current density distribution of the fuel cell membrane 10 can be controlled.

Figure 8:
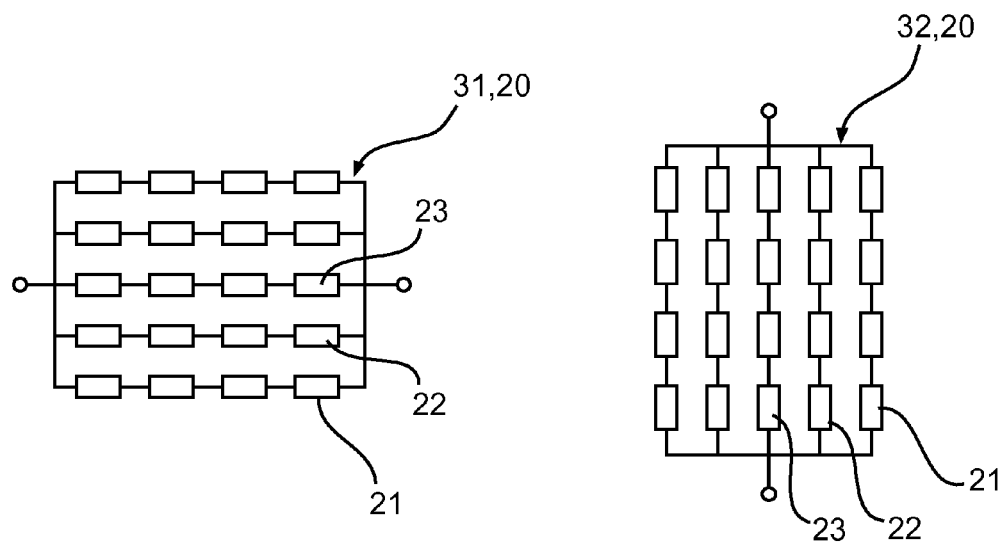
FIG. 8 shows a horizontal grid and/or a vertical grid with piezo elements connected in parallel according to one embodiment of the invention.

However, the actuator may also be embodied as a piezo element which has a voltage to generate an electrical field, for example, under a corresponding application of pressure. Such an arrangement is shown in FIG. 8. FIG. 8 shows a vertical grid 32 comprised of a plurality of piezo elements 21, 22, 23 connected in parallel as well as a horizontal grid 31 comprised of a plurality of piezo elements 21, 22, 23 connected in parallel. The piezo elements may be wired not only in parallel but also in series, as indicated in FIG. 8. An actuator 20 which can supply an electrical field by a corresponding pressure application can be supplied in this way and can be used to control the current density distribution in the fuel cell membrane.

Figures 9A, 9B, 9C:
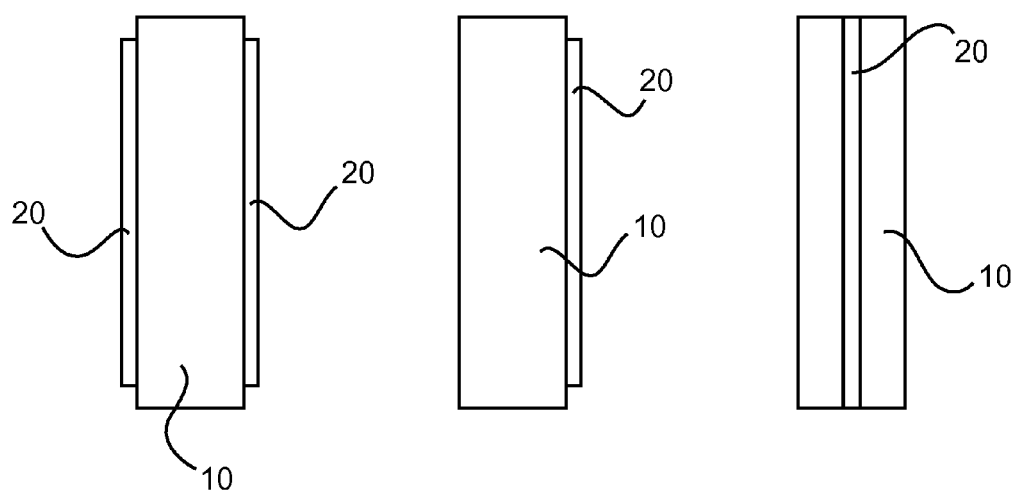
FIGS. 9a to 9c show a basic arrangement of an actuator with respect to a fuel cell membrane according to one of the arrangements shown in FIG. 6a to FIG. 8 in a sectional view and/or a side view.

FIGS. 9a to 9c show basic designs for how a corresponding actuator, in particular an actuator according to FIGS. 6a, 7a and 8 can be arranged with reference to the fuel cell membrane 10. FIG. 9a shows application of an actuator to both of the two main side faces of the fuel cell membrane. Alternatively, however, a corresponding actuator may also be arranged on just one side of the membrane 10, as shown in FIG. 9b. In addition, the actuator 20 may also be arranged in the interior of the fuel cell membrane 10, in particular in the form of piezo elements, a semiconductor layer with fiberoptics or also a transistor semiconductor layer, as illustrated in FIG. 9c. It should be pointed out that an actuator need not necessarily be oriented with the main surfaces of the fuel cell membrane but may also act via the edges.

Control of the properties of the electrolyte via the conductivity, consistency and phase transition can be achieved through such an arrangement of an actuator directly on the fuel cell membrane and/or in the fuel cell membrane according to the invention. It should be pointed out that as an alternative, such an actuator may also be implemented in other forms, for example, as an actuator made of plastic, metal or a semiconductor material and/or a combination of such materials. Alternatively, such a control element may also be embodied as a memory metal grid. The actuator may be designed mechanically, micromechanically, electrically, magnetically, optically, hydraulically or pneumatically. In addition, it may be controlled through a change in temperature. Thus the operating performance of the fuel cell is improved with direct control of the membrane, which acts without a delay. In particular the lifetime of the fuel cell is increased when it is controlled internally and can be shut down rapidly in critical operating states, e.g., at a high membrane temperature. In addition, the availability of the fuel cell is increased because it need not be shut down until later in a load event and/or in the event of an electronic or electrical overload, and thus it is available to supply electricity for a longer period of time. Furthermore, the dynamics are also increased because a higher reaction rate can be achieved. In addition, the protective technology of a fuel cell can be greatly simplified because the fuel cell can supply a higher current amplitude for a short period of time in the event of a fault and thus an overcurrent-time protection device may be used to protect the fuel cell. The fuel cell can also supply higher currents, so-called overload currents, for a brief period of time due to this novel type of control, and thus the entire system may be designed with smaller dimensions, so that a fuel cell of this embodiment would have a lower weight and thus a higher power density at the same maximum power. Due to the fact that the membrane can be shut down more quickly, the overall operating reliability can be increased, in particular because the fuel cell can operate in a more controlled manner at higher temperatures and the danger of risk can be minimized due to the rapid shutdown option.

It should be pointed out that the term "comprises" does not rule out other elements, nor does the term "a" or "an" rule out other elements.

The reference numerals used here are used only to increase the understandability and should by no means be considered as restrictive, and the scope of protection of the invention is defined by the claims.

LIST OF REFERENCE NUMERALS 1 fuel cell membrane unit
2 fuel cell
4 anode
5 cathode
6 gas conductor plates
10 fuel cell membrane
11 membrane surface
12 membrane surface
20 actuator
21 piezo element
22 piezo element
23 piezo element
24 semiconductor layer
24p p-doped semiconductor area
24n n-doped semiconductor layer
25 optical fiber
26 field effect transistor structure
27 gate of a field effect transistor
30 grid structure 31 horizontal grid
32 vertical grid
41 control of horizontal grid
42 control of vertical grid
43 voltage measurement
44 current measurement
45 di/dt measurement
50 load, consumer
S source
D drain
G gate
U voltage
I current
P power
L length of fuel cell
RL load resistor, consumer
p.u. per unit

The invention claimed is:

1. A fuel cell membrane unit for use between an anode and a cathode in a fuel cell, wherein the fuel cell membrane unit comprises:
 a fuel cell membrane, and
 an actuator, which is connected to the fuel cell membrane and is configured to control a current density distribution in the fuel cell membrane.

2. The fuel cell membrane unit according to claim 1, wherein the actuator comprises a grid for generating at least one of an electrical field and a magnetic field.

3. The fuel cell membrane unit according to claim 2, wherein at least a portion of the grid structure is embedded in the fuel cell membrane.

4. The fuel cell membrane unit according to claim 1, wherein the actuator comprises a horizontal grid and a vertical grid, wherein the horizontal grid is arranged so that it is rotated by essentially 90° relative to the vertical grid.

5. The fuel cell membrane unit according to claim 4, wherein the horizontal grid and the vertical grid lie directly one above the other.

6. The fuel cell membrane unit according to claim 4, wherein the horizontal grid and the vertical grid are arranged on opposite surfaces of the fuel cell membrane.

7. The fuel cell membrane unit according to claim 4, wherein at least one of the horizontal grid and the vertical grid is constructed as a grid having a plurality of piezo elements connected in parallel.

8. The fuel cell membrane unit according to claim 1, wherein the actuator comprises a piezo element which is designed to generate at least one of an electrical field and a magnetic field under the influence of pressure to control the fuel cell membrane.

9. The fuel cell membrane unit according to claim 1, wherein the actuator comprises a semiconductor layer and an optical fiber, such that the optical fiber is designed to generate at least one of an electrical field and a magnetic field on a p-n structure of the semiconductor layer with a photoelectric effect for controlling the fuel cell membrane.

10. The fuel cell membrane unit according to claim 1, wherein the actuator comprises at least one field effect transistor structure which is designed to control at least one of an electrical field and a magnetic field via a gate for controlling the fuel cell membrane.

11. A fuel cell comprising
 an anode,
 a cathode,
 a fuel cell membrane unit arranged between the anode and the cathode according to claim 1 for operation with energy flow primarily chemically to secondarily electrically.

12. A high-pressure electrolysis cell comprising
 an anode,
 a cathode,
 a fuel cell membrane unit arranged between the anode and the cathode according to claim 1 for operation with energy flow primarily electrically to secondarily chemically.

* * * * *